United States Patent [19]

Kalb

[11] 4,303,100

[45] Dec. 1, 1981

[54] KELLY VALVE

[75] Inventor: Gerald F. Kalb, Fort Worth, Tex.

[73] Assignee: Geosource Inc., Houston, Tex.

[21] Appl. No.: 970,192

[22] Filed: Dec. 18, 1978

[51] Int. Cl.³ ........................................... F16K 15/14
[52] U.S. Cl. .................................... 137/853; 175/218; 175/318; 251/5
[58] Field of Search ........................ 137/493, 843, 853; 166/319, 326; 175/218, 317, 318, 243; 251/5; 264/32, 269, 270

[56] References Cited

U.S. PATENT DOCUMENTS

| 1,861,726 | 6/1932 | Trout | 137/112 X |
|---|---|---|---|
| 2,247,363 | 7/1941 | Dunn | 251/5 X |
| 3,239,100 | 3/1966 | Peterson | 251/5 X |
| 3,292,718 | 12/1966 | Stone | 175/318 |
| 3,349,856 | 10/1967 | Richardson | 175/243 X |
| 3,364,533 | 1/1968 | Sibrava | 251/5 X |
| 3,367,422 | 2/1968 | Sims | 175/243 X |
| 3,481,610 | 12/1969 | Slator | 251/5 X |
| 3,640,354 | 2/1972 | Rassieur | 166/326 X |
| 3,703,213 | 11/1972 | Kammerer | 175/318 |
| 3,982,723 | 9/1976 | Ford | 251/5 |

FOREIGN PATENT DOCUMENTS 2730554 9/1978 Fed. Rep. of Germany ...... 175/218

Primary Examiner—Robert G. Nilson
Attorney, Agent, or Firm—Wm. T. Wofford; James C. Fails; Arthur F. Zobal

[57] ABSTRACT

An improved kelly valve of a type wherein a flexible inner valve body closes the valve passageway responsive to the pressure of a gaseous control fluid contained within a sealed chamber and opens the passageway responsive to exterior pressure of drilling fluid or of tools being passed through the valve. The improvements enhance the operating life of the flexible member and simplify the valve structure and assembly and disassembly procedures.

3 Claims, 5 Drawing Figures

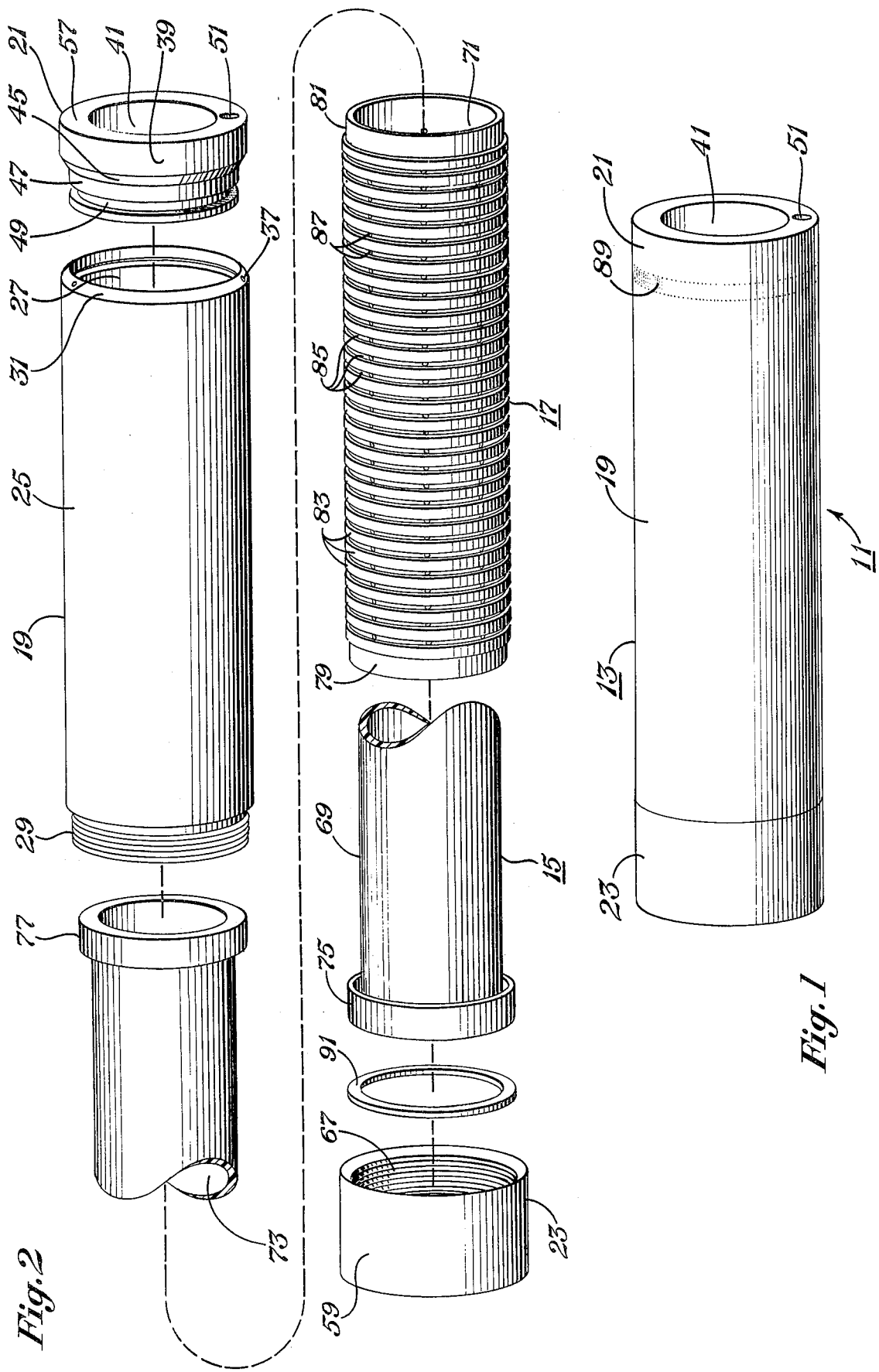

KELLY VALVE

FIELD OF THE INVENTION

The invention relates to improvements in valve assemblies of the type generally referred to as a "kelly valve" or "mud saver valve".

BACKGROUND OF THE INVENTION

In the drilling of wells, drilling fluid or mud is ordinarily circulated through the drill string and well bore. Such mud is pumped into the kelly at the upper end of the drill string and passes through the kelly into the drill string suspended therefrom. It is periodically necessary to disconnect the kelly from the remainder of the drill string, for example, in order to add additional sections of pipe to the string or to remove pipe sections therefrom. At such times, the mud pumps are shut down so that mud will not continue to be pumped through the kelly while it is disconnected. However, a significant quantity of mud remains in the kelly downstream of the pump, and can thus spill from the lower end of the kelly onto the rig floor when the kelly is disconnected.

Such spillage has a number of disadvantages, not the least of which is waste of the mud itself. The wasted mud spills onto the floor of the drill rig making the work site messy and unpleasant. Furthermore, the mud is usually slippery, and its presence on the equipment and the rig floor make the work difficult and even hazardous for the crew. Additionally, it is impossible for the crew to work on or with the kelly while the mud is flowing therefrom, and they must, therefore, wait for the mud to drain before continuing with their work. This in turn increases the time and expense of any given operation.

In an effort to aleviate the above described problems, various valve devices have been designed for disposition at the lower end of the kelly to prevent spilling of the mud therefrom when the kelly is disconnected from the drill or operating string. One such effort is represented by the kelly valve as shown and described in my copending application Ser. No. 881,188, filed Feb. 27, 1978, now abandoned. Field experience with that kelly valve revealed a number of deficiencies. One such deficiency was that the inner valve body, which was a cylinder of elastomeric material with flanged end portions, had to be deformed in order to assemble it onto the outer valve body, and such deformation caused weakness which lead to early failure. Another deficiency was that, when subjected to mud flow pressures, the inner valve body would take a permanent set at its end regions where it was secured to inwardly extending flange portions of the outer valve body, thus producing further weakness contributing to early failure. Another deficiency was the complexity of assembly and disassembly due to securing of the inner body member to the outer body member by means of bolt rings. A further deficiency was that the maximum inner diameter of the kelly valve was limited due to the inwardly extending flange portions of the outer valve body.

It is accordingly the general object of this invention to provide an improved kelly valve.

Another object of the invention is to provide a kelly valve which obviates the deficiencies of the kelly valve disclosed in said co-pending application.

For a further understanding of the invention and further objectives, features, and advantages thereof, reference may now be had to the following description, taken in conjunction with the accompanying drawings.

BRIEF DESCRIPTION OF THE DRAWINGS

FIG. 1 is a schematic perspective view showing a preferred embodiment of the valve assembly of the present invention.

FIG. 2 is a schematic perspective view of the parts of the valve assembly of FIG. 1, shown in exploded form.

SUMMARY OF THE INVENTION

Figure 4:
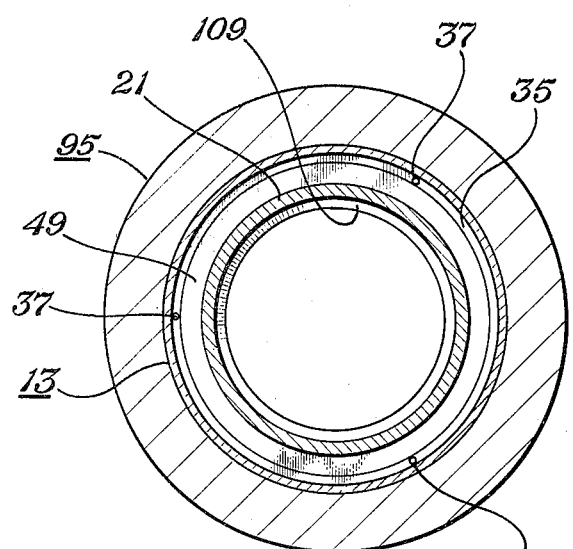
FIG. 4 is a section view taken at IV—IV of FIG. 3.

The present invention pertains to an improved kelly valve which is inserted in a drill string immediately below the kelly and serves to prevent spillage of drilling fluid (mud) when the kelly is disconnected from the drill string to permit addition or removal of drill pipe sections, while allowing passage of drilling fluid or tools when the kelly is connected in the drill string.

The improved kelly valve comprises an annular outer valve body member, a flexible annular inner valve body member disposed generally coaxially within the outer valve body member so that the inner valve body member defines a passageway extending radially inwards of same; means merging end portions of the outer and inner valve body members to form an annular sealed chamber therebetween; a compressible gaseous control fluid disposed within the chamber to pressurize same so the inner valve body is radially extended to close the passageway in the presence of fluid pressures below a predetermined release value in an area external to the chamber, with the control fluid being compressible in the presence of fluid pressures greater than or equal to the release value to cause the inner valve body member to move radially outwards to open the passageway; and a backup liner interposed between the outer and inner valve body members and having passages for permitting flow of the control fluid to and from the liner interior.

The outer valve body member and the backup liner have the general form of hollow cylinders, with the backup liner nesting within the outer valve body member, with a sufficient clearance or open space between them (except at the end portions) to conveniently contain the compressible control fluid (which is preferably air) when the kelly valve is in the opened condition. This clearance or open space may be obtained in part by means of lands or grooves on one or both of the outer valve body member interior surface and the backup liner exterior surface. A greater kelly valve inner diameter can be achieved while maintaining satisfactory structural integrity by utilizing lands and grooves on both parts. The outer valve body member and the backup liner are made of rigid materials, preferably metal, so as to have a satisfactory structural integrity.

The flexible inner valve body member is preferably made of an elastomeric material having the shape of a hollow cylinder having an outer diameter that is substantially the same as the inner diameter of the backup liner. Further, the above mentioned means merging end portions of the outer and inner valve body members is preferably a means clamping inner valve body flanged end portions between the backup liner end portions and the outer valve body member. In the preferred embodiment the inner valve body member is actually molded in place on the backup liner, thus utilizing the backup liner as a part of the mold. Further, in accordance with the preferred embodiment, the inner valve body flanged end portions are bonded to end portions of the backup liner exterior surface.

Briefly stated, the primary features of the improved kelly valve of the present invention are the provision of a backup liner; the molding of the inner valve body directly in place on the backup liner, utilizing the backup liner as a part of the mold; the combination backup liner and inner valve body as a single part which does not require either assembly or disassembly; the provision of an outer valve body member that serves as a container for receiving the combination backup liner-inner valve body member and sealingly clamping the ends of the latter between shoulders by merely threading an end piece of the former, with no further assembly being required; and the larger inner valve body passageway made possible by the improved structure.

DESCRIPTION OF PREFERRED EMBODIMENT

Referring now to the drawings, there is shown a valve assembly 11 in accordance with a preferred embodiment of the invention. As best shown by FIG. 2, the principle parts of the valve assembly 11 are an outer valve body member 13, an inner valve body member 15 and a backup liner 17.

Figure 5:
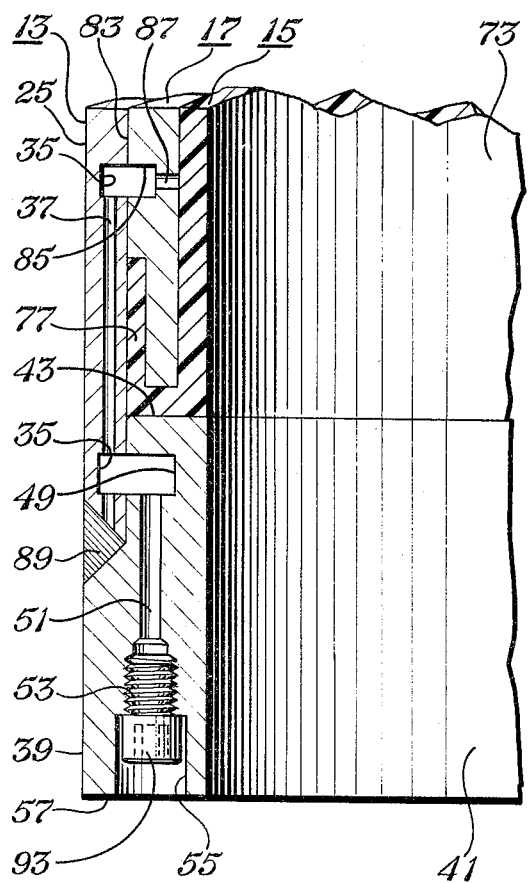
FIG. 5 is an enlarged fragmentary detailed view of a lower left portion of FIG. 3.

The outer valve body member 13 is made up of a central body portion 19 and first and second end pieces 21, 23. The central body portion 19 has cylindrical exterior and interior surfaces 25, 27, external threads 29 at one end portion and a bevel 31 at the other end portion. The cylindrical interior surface 27 is provided with lands 33 and grooves 35 (see FIG. 3) for a purpose to be hereinafter explained. A plurality of small bores 37 (see FIG. 4) extend from the bevel 31 to communicate with the nearest groove 35 and beyond to the next groove 35 (see FIG. 5) for a purpose to be hereinafter explained.

The first end piece 21 has the form of an annular cap having a cylindrical exterior surface 39 of the same diameter as that of the central body portion 19, and a central cylindrical bore 41 having a diameter somewhat less than that of the central body portion interior surface 27 so as to form an inner shoulder 43 as will be hereinafter more fully explained. The cylindrical exterior surface 39 merges with a bevel 45 that in turn merges with a small diameter cylindrical surface 47 which is sized to mate with the cylindrical interior surface 27 of the central body portion 19 (see FIG. 5). The cylindrical surface 47 is interrupted by a first end piece groove 49. A first end piece small bore 51 having a threaded portion 53 and a counter bore portion 55 communicates from the first end piece outer face 57 to the first end piece groove 49 for a purpose to be hereinafter explained.

The second end piece 23 has the form of an annular cap having a cylindrical exterior surface 59 of the same diameter as that of the central body portion 19, and a central cylindrical bore 61 having a diameter somewhat less than that of the central body portion interior surface 27 so as to form an inner shoulder 63 with an annular groove 65 as will be hereinafter more fully explained. The second end piece is provided with a threaded counter bore 67 sized to mate with the external threads 29 of the central body portion 19.

The inner valve body member 15 is cylindrical, having a cylindrical exterior surface 69 that mates with the interior cylindrical surface 71 of the backup liner 17, and a cylindrical interior surface 73 that has substantially the same diameter as that of the central cylindrical bores 61, 41 of the end pieces 19, 21. The inner valve body member 15 has an annular flange 75, 77 at each of its end portions, shaped to conform with the end portions 77, 79 of the backup liner 17.

The backup liner 17 is cylindrical, having an exterior surface provided with alternate lands 83 and grooves 85 for a purpose to be hereinafter explained. The diameter of the lands 83 is slightly less than that of the outer valve body member central body portion cylindrical interior surface 27. Each said groove 85 is provided a plurality of holes 87 spaced about its circumference, which holes communicate with the backup liner interior 71 for a purpose to be hereinafter explained.

The inner valve body member 15 is made of an elastomeric material, preferably a polyurethane rubber, and is molded onto the backup liner 17, utilizing the backup liner as a part of the mold. The end portions 79, 81 of the backup liner 17 are cylindrical and have a reduced diameter such that the annular flanges 75, 77 of the inner valve body member 15 will not extend outwardly beyond the diameter of the lands 83. The end portions 79, 81 are prepared for the molding process by vapor degreasing, then sand blasting, then applying a suitable conventional adhesive; with the consequence that in the molding process, the annular flanges 75, 77 become bonded to the end portions 79, 81. Thus, the inner valve body member 15 becomes an intregal part of the backup liner 17 and is never required to be either assembled or disassembled.

The first end piece 21 is made initally as a separate part so that the small bores 37 can be conveniently drilled in the central body portion 19 of the outer valve body member 13 and so that the first end piece groove 49 can be conveniently machined. The first end piece 21 is assembled onto the central body portion 19 and welded thereto. The annular "Vee" groove formed by the bevels 31, 45 is utilized to receive the welding material 89. The surface of the welding material is ground to conform with the exteriors 25, 39 of the central body portion 19 and the first end piece 21.

To assemble the valve assembly 11, the backup liner 17-inner valve body member 15 is simply inserted into the central body portion 19 of the outer valve body member 13 so that one end (it does not matter which end) rests on the inner shoulder 43 of the first end piece 21. Then the second end piece 23 is threaded onto the external threads 29 of the central body portion 19. A thrust bearing ring 91 is disposed in the annular groove 65 so that rotation of the second end piece 23 will not damage the adjacent end surface of the inner valve body member 15. The threading of the second end piece 23 onto the central body portion 19 forces the thrust bearing ring 91 to bear on the adjacent end face of the inner valve body member 15, so that the backup liner 17-inner valve body member 15 is securely clamped between the inner shoulder 43 of the first end piece 21 and the inner shoulder 63 of the second end piece 23.

A suitable conventional check valve 93 is installed in the threaded portion 53 and the counter bore portion 55 of the first end piece small bore 51. The cylindrical interior surface 27 of the central body portion 19 and the cylindrical exterior surface 69 of the inner valve body member 15 define a chamber which is made fluid-tight by the clamping action of the inner shoulders 43, 63 on adjacent inner valve body member 15 end surfaces. A compressible gaseous control fluid, preferably air, is injected via the check valve 93 into the chamber, and the chamber is pressurized so as to extend the inner valve body member 15 radially inwards to close the passageway through the central bore of the valve assembly 11 (see dotted lines in FIG. 3).

The valve assembly 11 may now be installed in an adapter sub 95 which can be connected at its upper end to the lower end of the kelly 97 (shown by dotted lines in FIG. 3) and at its lower end to a drill pipe (not shown). Thus, the adapter sub 95 may be inserted in a drill string immediately beneath the kelly. The upper and lower threaded connections 101, 103 on the adapter sub are standard drill string box and pin connections. The adapter sub has a lower bore portion 105 which has the same diameter as the inner diameter of a standard drill pipe and which opens to an enlarged counter bore 107 which has a diameter slightly greater than the outer diameter of the valve assembly 11. The valve assembly 11 is received within the enlarged counter bore 107 and rests at its lower end on a shoulder 109 formed at the juncture of the lower bore 105 and the enlarged counter bore 107. Upward movement of the valve assembly 11 within the adapter sub 95 is limited by the lower end of the kelly 97 when the adapter sub 95 has been joined to the kelly.

Figure 3:
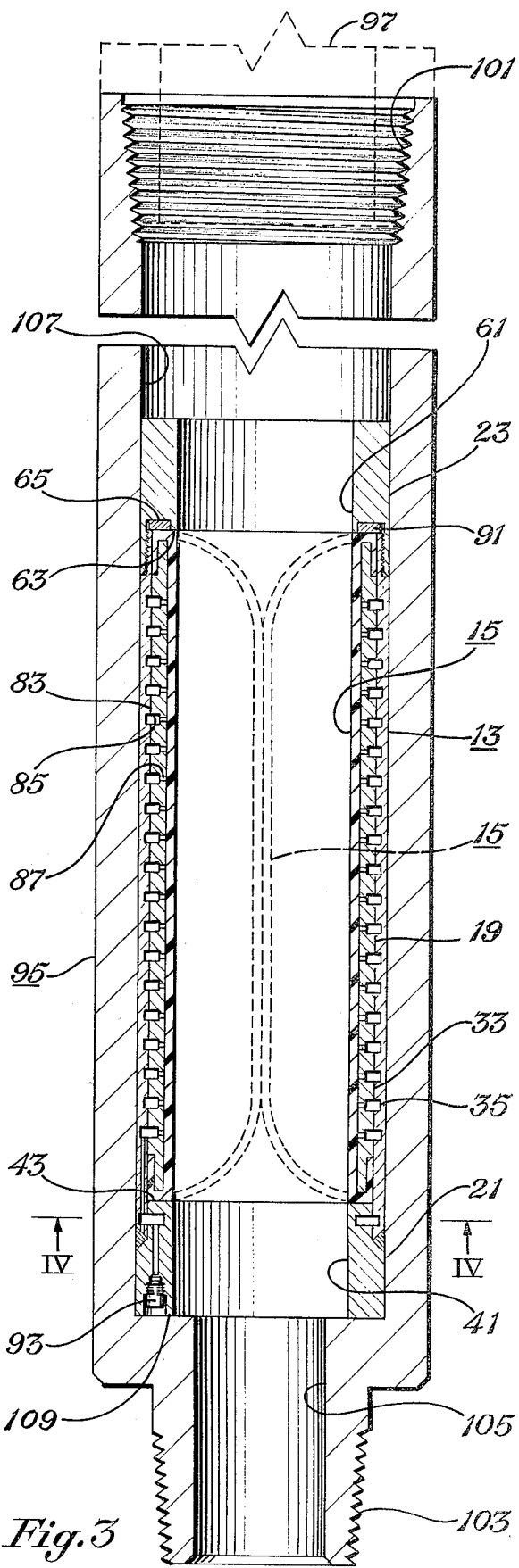
FIG. 3 is a longitudinal section view of the valve assembly of FIG. 1, shown installed in an adapter sub.

The chamber that is formed between the inner and outer valve body members 15, 13 is pressurized by the gaseous control fluid to a magnitude or value that will cause the inner valve member 15 to move inwardly to close the valve passageway, as shown by the dotted lines in FIG. 3, and to maintain a sufficient closing pressure to prevent the loss or leakage of drilling fluid (mud) from the kelly 97 when it is disconnected from the drill string. This closing pressure is not sufficient, however, to prevent normal drilling fluid flow when the kelly is connected in the drill string and drilling is in progress. This closing pressure further will not prevent the passage of the usual tools through the kelly valve passageway and into the drilling string below when that is necessary. The chamber is typically pressurized to about 15 psig. The route for introduction of the gaseous control fluid into the chamber is from the check valve 93 via the first end piece small bore 51 to the hollow annulus formed by the lowermost groove 35 of the outer valve body member 13 and the first end piece groove 49, and from there via the small bores 37 to the annulus formed by the next groove 35 of the outer valve body member 13 and the corresponding oppositely disposed groove 85 of the backup liner 17, and from there via the clearance between the lands 33 of the outer valve body member 13 and corresponding oppositely disposed lands 83 of the backup liner 17, and via the backup liner holes 87 to the various portions of the aforementioned chamber.

In a preferred embodiment, the following criteria and dimensions are typical: The outer valve body member 13 and the backup liner 17 are made of mild steel and the inner body member 15 is made of polyurothane rubber; outer valve body length 15 inches, outer diameter 4 inches, end piece bores 2.813 inches; clearance between lands 33, 83 of the outer valve body member and the backup liner 0.025 inches; width of outer valve body member and backup liner grooves 35, 85 and lands 33, 83, respectively ⅛ inch and ⅛ inch; depth of outer valve body member grooves 35 ⅛ inches; depth of backup liner grooves 85 0.188 inches; length of backup liners 17 11⅞ inches; inside diameter of backup liner 3⅝ inches; inside diameter of outer valve body member 13 3.625 inches; diameter of backup liner holes 87 1/16 inches; number of holes 87 is 4 per groove with 45 grooves equals 180.

The improved kelly valve in accordance with various aspects of the present invention has a number of advantages. The provision of a backup liner prevents the over stressing of parts of the inner valve body member due to deformation under mud flow pressures, thus removing a cause of premature failure of the inner valve body member. The molding of the inner valve body member directly onto the backup liner means that no assembly of the inner valve body member is required and the deformation of the inner valve body member that would otherwise be necessary is entirely avoided, thus removing another cause of premature failure. The combination backup liner-inner valve body member as a single part simplifies the assembly of the kelly valve. The provision of an outer valve body member that serves as a container for receiving the combination backup liner-inner valve body member and sealingly clamping the ends of the latter between shoulders by merely threading an end piece of the former, simplifies the kelly valve structure as well as assembly and disassembly. The improved kelly valve structure also makes it possible to provide a larger inner valve body passageway.

The configuration of the inner valve body member may be broadly described as being annular or tubular. In the preferred embodiment, the configuration of the inner valve body member is cylindrical along its entire length. Other possible configurations of inner valve body members would have cylindrical end portions merging into a central body portion having the shape of an ellipsoid, or an elliptic hyperboloid, or the like.

The foregoing disclosure and the showings made in the drawings are merely illustrative of the principles of this invention and are not be interpreted in a limiting sense.

What is claimed is:

1. A pressure responsive kelly valve assembly comprising:
   a. an annular outer valve body member having a cylindrical interior surface;
   b. a flexible generally tubular and elastomeric annular inner valve body member disposed generally coaxially within said outer valve body member, said inner valve body member defining a passageway radially inwards thereof;
   c. means merging end portions of said outer and inner valve body members whereby an annular chamber is formed therebetween;
   d. a compressible gaseous control fluid disposed in said chamber, said control fluid being pressurized to extend said inner valve body member radially inwards to close said passageway upon the presence of fluid pressures below a predetermined release value in an area external to said chamber and axially adjacent said passageway, said control fluid further being compressible upon the presence of fluid pressures greater than or equal to said release value in such area to permit said inner valve body member to move radially outwards in response to such fluid pressures to open said passageway;
   e. a backup liner interposed between said outer and inner valve body members, with said backup liner having cylindrical exterior and interior surfaces having passage means for permitting flow of said control fluid to and from the liner interior and with said backup liner exterior surface being provided lands and grooves;

f. said inner valve body further having annular flanged end portions shaped to conform with the end portions of said backup liner and bonded to end portions of the backup liner exterior surface; and g. said means merging end portions of said outer and inner valve body member being a means clamping said inner valve body annular flanged end portions between said backup liner end portions and said outer valve body member.

2. The valve assembly of claim 1 wherein said outer valve body member interior surface is provided lands and grooves.

3. The valve assembly of any of claims 1 or 2 wherein said compressible gaseous control fluid is air.

* * * * *